(12) United States Patent
Rittershofer et al.

(10) Patent No.: US 9,485,915 B2
(45) Date of Patent: Nov. 8, 2016

(54) COMBINE HARVESTER HAVING A FEEDERHOUSE

(71) Applicant: Deere & Company, Moline, IL (US)

(72) Inventors: Martin Rittershofer, Kaiserslautern (DE); Philipp Veit, Molauer Land (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/681,695

(22) Filed: Apr. 8, 2015

(65) Prior Publication Data

US 2015/0366139 A1 Dec. 24, 2015

(30) Foreign Application Priority Data

Jun. 18, 2014 (DE) .................. 10 2014 211 783
Mar. 27, 2015 (DE) .................. 10 2015 205 622

(51) Int. Cl.
| | | |
|---|---|---|
| *B65G 23/44* | (2006.01) | |
| *A01D 41/12* | (2006.01) | |
| *A01D 61/04* | (2006.01) | |
| *A01F 12/46* | (2006.01) | |
| *A01D 41/14* | (2006.01) | |
| *A01D 61/00* | (2006.01) | |

(52) U.S. Cl.
CPC .............. *A01F 12/46* (2013.01); *A01D 41/12* (2013.01); *A01D 41/14* (2013.01); *A01D 61/008* (2013.01); *B65G 23/44* (2013.01)

(58) Field of Classification Search
CPC .. B65G 23/44; A01D 41/12; A01D 41/1274; A01D 61/04

USPC .............. 56/122, 208, 16.4 R; 198/814, 816; 460/16, 18, 70, 71, 72, 114; 474/136–138
See application file for complete search history.

(56) References Cited

U.S. PATENT DOCUMENTS

| | | | | | |
|---|---|---|---|---|---|
| 2,312,838 | A | * | 3/1943 | Johnston | A01D 61/008 241/DIG. 30 |
| 3,718,197 | A | * | 2/1973 | Barten | G01G 11/02 177/16 |
| 5,030,173 | A | * | 7/1991 | Bryant | B65G 23/44 474/136 |
| 6,116,008 | A | * | 9/2000 | Digman | A01D 41/16 56/15.8 |
| 7,493,825 | B2 | * | 2/2009 | Hewitt | F16C 23/00 73/161 |
| 7,600,362 | B2 | * | 10/2009 | Wernsmann | A01D 61/008 56/14.5 |
| 8,770,392 | B2 | * | 7/2014 | Berger | B65G 21/16 198/813 |

* cited by examiner

*Primary Examiner* — John G Weiss

(57) ABSTRACT

A combine harvester (10) has a feederhouse assembly (20) that comprises a housing (62). The housing (62) contains feederhouse rollers (64, 80), about which an endless conveying element (82) circulates. The endless conveying element (82) is made from an inherently flexible material having slats (84) fastened thereon. A first feederhouse roller (80) is mounted movably along an imaginary connecting line (95) between the feederhouse rollers (64, 80) and can be coupled to a spring (86) that pre-tensions the endless conveying element (82) and brings the first feederhouse roller (80) into a target position. The movement of the first feederhouse roller (80) toward the second feederhouse roller (64) is limited to this target position.

8 Claims, 2 Drawing Sheets

COMBINE HARVESTER HAVING A FEEDERHOUSE

FIELD OF THE INVENTION

The invention relates to a feederhouse assembly for a combine harvester, having a housing, at the rear end of which an upper feederhouse roller is rotatably mounted, a lower feederhouse roller rotatably mounted at the front end of the housing, and an endless conveying element that is made of an inherently flexible material with slats fastened therein and circulates about the lower feederhouse roller and the upper feederhouse roller, wherein a first of the feederhouse rollers is mounted so as to be movable relative to the housing toward and away from the second feederhouse roller along an imaginary line between the feederhouse rollers.

BACKGROUND

Self-propelled combine harvesters comprise a chassis that is supported on the ground by front, driven wheels (or track drive mechanisms) and rear, steerable wheels. A feederhouse assembly, at the front end of which a harvester head is in turn mounted, is arranged on the front side of the combine harvester. The harvester head can be designed, for example, as a cutting mechanism having a mower bar and a reel arranged thereabove or a transverse conveying auger or a transverse conveyor belt, or it can be designed as a corn picker having picking units and a transverse conveying auger. During harvesting, the harvester head conveys the cut-off or taken-up crop through a rearward discharge opening onto the feederhouse assembly, which in turn conveys it into the interior of the combine harvester, where it is threshed, separated and cleaned.

The feederhouse assembly comprises a housing, in which a chain conveyor, typically operating in an undershot manner, circulates about an upper and a lower feederhouse roller, which are mounted in the housing. The lower feederhouse roller is arranged to the rear of the discharge opening of the harvester head, and the upper feederhouse roller, which cooperates with the chains of the chain conveyor by means of pinions, transfers the crop to an (axial or tangential) threshing drum or to an accelerator roller in the combine harvester.

A feederhouse assembly that operates in an undershot manner and has a rubber-fabric belt that comprises transversely arranged steel bars that engage with the crop has also been proposed (DE 10 2009 036 104 A1). The belt is likewise driven by the upper feederhouse roller, which is furnished with axially-extending cams, which engage between nubs on the inner side of the belt.

The conveyor must be tensioned sufficiently to guarantee a transmission of torque from the driven feederhouse roller to the chain conveyor and to prevent the chain from slipping over the nubs, particularly under a heavy load of crop on the feederhouse. In the prior art, feederhouses equipped with chains were tensioned by springs acting on the lower feederhouse roller, which guarantees a certain, sufficient pre-tension (DE 10 2004 036 183, U.S. Pat. No. 4,362,005), or by hydraulic cylinders (DE 199 25 691 A1, DE 10 2012 007 637 A1) or only by moving the lower feederhouse roller to a desired position and fixing it there (U.S. Pat. No. 2,858,012 A).

Because spring pre-tensioning of feederhouses having a rubber-fabric belt has the disadvantage that the tension is either not sufficient to prevent the cams of the belt from slipping on the driven feederhouse roller or must be so high that heavy wear on the belt results, it is necessary that the adjustable feederhouse roller in such feederhouses be locked in the correct position, analogously to U.S. Pat. No. 2,858,012 A, or the adjustable feederhouse roller must be prevented from approaching the other feederhouse roller any closer than a predetermined position. This correct position is determined on the basis of a measurement of the distances between the adjacent cams of the belt, which must then be converted into the target distance between the axes of rotation of the feederhouse rollers. This procedure is cumbersome, time-consuming and prone to error.

A problem addressed by the present invention is that of avoiding the aforementioned disadvantages.

SUMMARY OF THE INVENTION

In accordance with one aspect of the invention, a combine harvester comprises a feederhouse which further comprises a housing, at the rear end of which an upper feederhouse roller is rotatably mounted, a lower feederhouse roller rotatably mounted at the front end of the housing, and an endless conveying element that is made of an inherently flexible material with slats fastened therein and rotates about the lower feederhouse roller and the upper feederhouse roller. A first of the feederhouse rollers is mounted movably relative to the housing toward and away from the second feederhouse roller along an imaginary connecting line between the feederhouse rollers.

In order to move the first, movable feederhouse roller into a correct position more simply and precisely than previously, a spring that can be coupled to the first feederhouse roller is provided. In the coupled state, this spring pre-tensions the first feederhouse roller, otherwise movable freely along said connecting line, with a force directed away from the second feederhouse roller. At the same time, a defined tension is applied to the conveying element. In this state, the first feederhouse roller is in its target position, which it is also intended to assume in a subsequent harvesting operation. The movement of the first feederhouse roller toward the second feederhouse roller in this state is now limited to a target position of the first feederhouse roller that results from the force of the spring.

In the state in which the first feederhouse roller is tensioned by the spring and in which it is in its target position, a possible movement path of the first feederhouse roller in the direction toward the second feederhouse roller is limited to the target position. The first feederhouse roller can therefore not move past the target position in the direction toward the second feederhouse roller. This has the effect that the tension on the conveying element matches a certain desired minimum value that is necessary for transmitting the driving torque from the driven feederhouse roller to the conveying element, but does not significantly exceed that value.

The first feederhouse roller could (after the described adjusting process) move freely in the opposite direction, i.e. away from the second feederhouse roller, but it is advisable to fix it in this direction as well, i.e. locked in the target position, once the target position has been found and the movement path of the first feederhouse roller toward the second feederhouse roller has been limited to this position.

As a rule, the first feederhouse roller is the lower feederhouse roller and the upper feederhouse roller is drivable. It would be conceivable, however, to drive the lower feederhouse roller and/or to design the upper feederhouse roller to be position-adjustable.

The first feederhouse roller can preferably be limited in movement or locked at both ends and coupled to a spring at each end.

The spring can be relaxed or removed and may be loaded with a defined pre-tension by using a gauge or scale.

In one possible embodiment, a bracket extending transversely to the imaginary connecting line and furnished with an opening is attached to the outer side of the housing. The end of an axle of the first feederhouse roller can penetrate through a slotted hole extending along the imaginary connecting line in the housing. The axle of the first feederhouse roller can be connected to a front end adjusting rod extending along the connecting line, the rod penetrating the opening in the bracket and being coupled at the outer end of the rod distant from the axle to a first end of the spring, which is supported at a second end on the housing, more particularly on a U-profile coupled to the bracket. The limitation of the movement of the first feederhouse roller toward the target position can be provided between the adjusting rod and the bracket.

In particular, the spring is a helical spring operating with tensile or compressive force.

The limitation of the movement of the first feederhouse roller to the target position can be realized by a nut contacting the bracket and interacting with a thread of the adjusting rod.

A second nut interacting with a thread of the adjusting rod can be brought into contact on a second side of the bracket in order to lock the first feederhouse roller.

In accordance with another aspect of the invention, a combine harvester is provided comprising: wheels (14, 16) for engaging the ground and carrying the combine harvester (10) through an agricultural field; a chassis (12) supported on the wheels;

a threshing drum (22) supported on the chassis (12); a threshing basket (34) wrapped around a portion of the threshing drum (22); and a feederhouse assembly (20) supported on the chassis (12) and disposed in front of the threshing drum (22), wherein the feederhouse assembly (20) comprises, a housing (62) having a front end configured to receive crop from an agricultural harvesting head and a rear end configured to transmit crop to the threshing drum (22), an upper feederhouse roller (64) rotatably mounted at the rear end of the housing (62), a lower feederhouse roller (80) rotatably mounted at the front end of the housing (62), and an endless conveying element (82) comprising an inherently flexible material, and further comprising slats (84) fastened to the inherently flexible material, wherein the endless conveying element (82) is configured to circulate about the lower feederhouse roller (80) and the upper feederhouse roller (64), wherein a first of the feederhouse rollers (64, 80) is mounted so as to be movable relative to the housing (62) toward and away from a second of the feederhouse rollers (64, 80) along an imaginary connecting line (95) that extends between the feederhouse rollers (64, 80), characterized in that the first of the feederhouse rollers (64, 80) is configured to be coupled to a spring (86), to pre-tension the first of the feederhouse rollers (64, 80) with a force directed away from the second of the feederhouse rollers (64, 80) and applies a defined tension to the endless conveying element (82), and in that the movement of the first of the feederhouse rollers (64, 80) in the direction toward the second of the feederhouse rollers (64, 80) can be limited to a target position of the first of the feederhouse rollers (64, 80) that results from the force of the spring (86).

The first of the feederhouse rollers may be locked with respect to the housing (62) in the target position.

The first of the feederhouse rollers may be the lower feederhouse roller (80). The upper feederhouse roller may be drivable.

The first of the feederhouse rollers may be restricted in movement or locked at both ends and may be connected at each end to a spring (86).

The spring may be relaxed or removed (or both) during normal operation of the feederhouse assembly (20) and may be loaded with a defined pre-tension using a gauge (106) or a scale.

A bracket may extend transversely to the imaginary connecting line (95) between the feederhouse rollers (64, 80) and may have an opening (96). The bracket may be mounted on the outer side of the housing (62), and a pivot axis (112) coupled by a pivoting mid floor (116) to an axle (88) of the first of the feederhouse rollers (64, 80) may penetrate through a slotted hole (90) extending in the housing (62) along the imaginary connecting line (95). The pivot axis may be connected to an adjusting rod (92) extending along the imaginary connecting line (95). The adjusting rod may extend through the opening (96) in the bracket and an outer end of the adjusting rod that faces away from the axle, may be coupled to a first end of the spring (86). A second end of the spring may be supported on the housing (62) on a U-profile (100) that is coupled to the bracket (98). The first of the feederhouse rollers (64, 80) may be fixed at the target position by fixing the adjusting rod (92) to the bracket (98).

The spring may be a helical (or coil) spring operating in compression or intention (i.e. the spring may be a compression spring or a tension spring.

Movement of the first of the feederhouse rollers (64, 80) may be limited to the target position by a nut (108) that contacts the bracket (98) on a first side of the bracket and is threadedly engaged with a thread of the adjusting rod (92).

A second nut that is also threadedly engaged with a thread of the adjusting rod (92) may be brought into contact with a second side of the bracket (98) to thereby lock the first of the feederhouse rollers (64, 80) in the target position.

These and other problems, features and advantages of the present invention will become clear to a person skilled in the art after reading the detailed description below and in view of the drawings, the reference numbers of which shall not be construed as limiting the interpretation of the claims.

DETAILED DESCRIPTION

Figure 1:
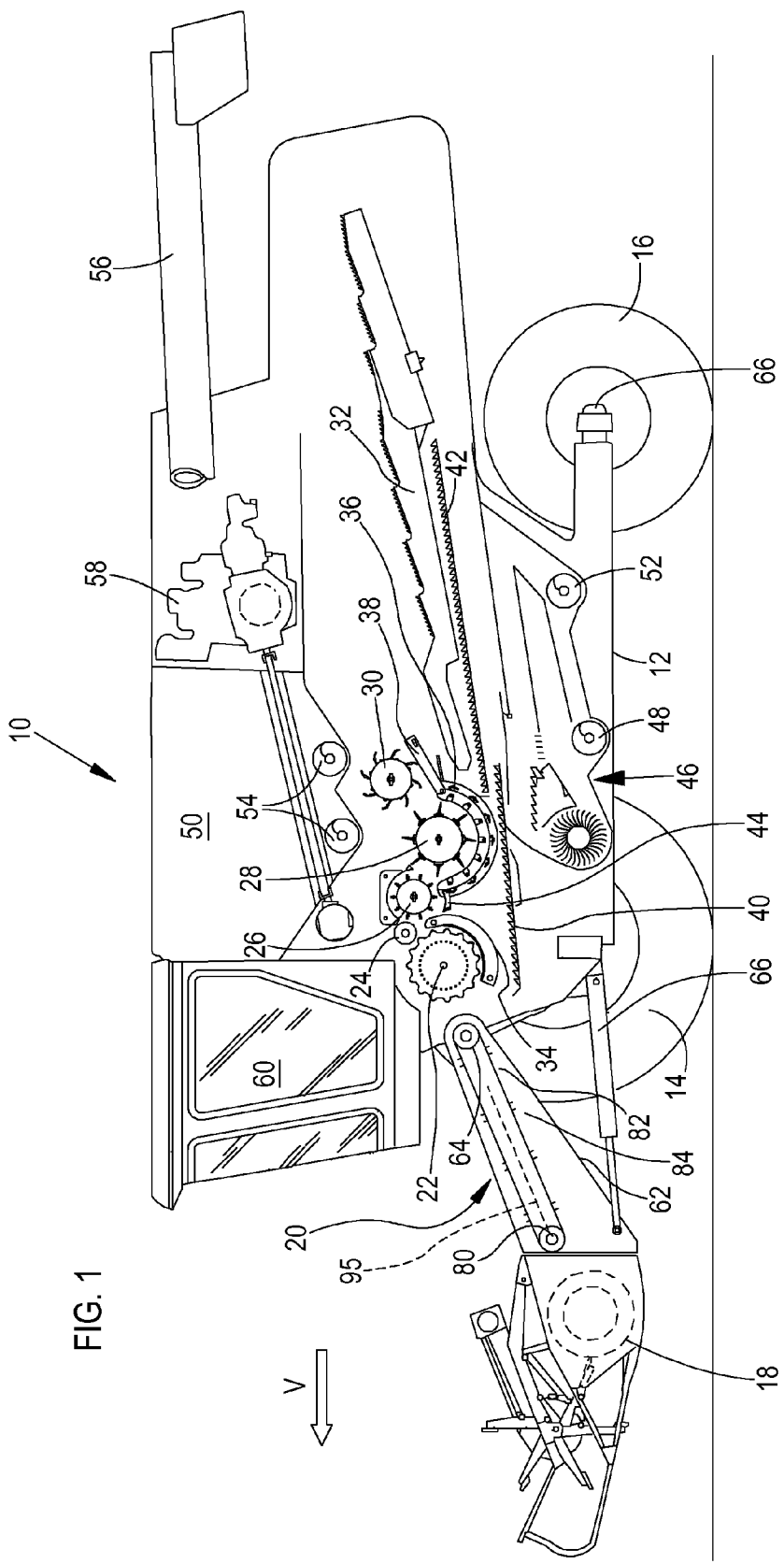
FIG. 1 is a side view of a combine harvester having a feederhouse assembly.

FIG. 1 shows a self-propelled harvesting machine in the form of a combine harvester 10 having a chassis 12 that is supported on the ground via front wheels 14 that are driven and rear wheels 16 that are steerable and is propelled thereby. The front wheels 14 are driven by drive means, not shown in detail, in order to move the combine harvester 10 on a field to be harvested. Directional indications such as front and back refer below to the driving direction V, to the left in FIG. 1, of the combine harvester 10 in harvesting operation. The front wheels 14 could also be replaced by track drive mechanisms.

A harvester head 18 in the form of a cutting mechanism is removably connected to the front end area of the combine harvester 10 in order to harvest crop in the form of grain or other threshable crops from the field and feed it upward and to the rear by means of a feederhouse assembly 20, on which the harvester head 18 is removably mounted, to a multi-drum threshing mechanism that comprises, arranged in succession in the travel direction V, a threshing drum 22, a stripper drum 24, a drum conveyor 26 of the overshot type, a tangential separator 28 and a turning drum 30. A straw shaker 32 is located downstream of the turning drum 30. In its lower and rear area, the threshing drum 22 is surrounded by a threshing basket 34. Underneath the drum conveyor 26 there is a cover 44, with a contiguous surface or furnished with openings, while above the drum conveyor 26 there is a fixedly mounted cover, and a separating basket 36 with adjustable finger elements is located underneath the tangential separator 28. A finger rake 38 is arranged underneath the turning drum 30. In place of the illustrated multi-drum threshing mechanism, any other threshing and separating equipment can be used, e.g. a single tangential threshing drum with downstream straw shakers or separating rollers, or an axial threshing and separating device with one or two axial threshing and separating rotors.

The mixture containing grain and impurities that passes through the threshing basket 34, the separating basket and the straw shaker 32 reaches a cleaning apparatus 46 via conveying floors 40, 42. The grain cleaned by the cleaning apparatus 46 is fed by means of a screw auger 48 to an elevator, not shown, which conveys it into a grain tank 50. A return auger 52 passes unthreshed head parts through an additional elevator, not shown, back into the threshing process. The chaff can be ejected at the rear side of the screen device by a rotating chaff distributor, or it is ejected by a straw chopper (not drawn) arranged downstream of the straw shaker 32. The cleaned grain can be unloaded from the grain tank 50 by a discharge system with cross augers 54 and a discharge conveyor 56. The above-mentioned systems are driven by means of an internal combustion engine 58 and are checked and controlled by an operator from a driver's cab 60.

The feederhouse assembly 20 comprises a housing 62, which is rotatably articulated on the chassis 12 about the axis of an upper feederhouse roller 64 that extends horizontally and transversely to the forward direction. The feederhouse assembly 20 is swiveled about the axis of the upper feederhouse roller 64 by means of two actuators 66 in the form of hydraulic cylinders, which are articulated on either side of the feederhouse assembly 20, at one end to the lower, front end of the chassis 12, and at the other end, to the rear of the front, lower end of the housing 62 of the feederhouse assembly 20. A controller (not shown) drives the actuator 66 during harvesting in such a manner that the harvester head 18 is moved at a desired height or with a desired contact force across the ground of the field to be harvested. The housing 62 of the feederhouse assembly 20 comprises, in a conventional manner, lower and upper walls that are connected to another by lateral walls.

A lower feederhouse roller 80 is rotatably mounted on the housing 62. Its axis of rotation extends transversely to the forward direction V and horizontally. An endless conveying element 82 having slats 84 and conveying the crop in an undershot manner circulates around the feederhouse rollers 64, 80. The endless conveying element 82 is stretchable and preferably comprises a plurality of rubber-fabric belts 89 distributed across the width of the housing 62 that are connected to one another by the slats 84. The endless conveying element 82 is driven via cams arranged on the interior side thereof that engage with corresponding depressions in the upper feederhouse roller 64, which can be driven by the internal combustion engine 58. The slats 84 are formed as U-shaped steel strips that extend across the width of the housing 62, but could consist of some other material and have a different cross section. In order to produce an optimal connection between the slats 84 and the endless conveying element 82, threaded bolts are vulcanized into the rubber-fabric belt 89.

The endless conveying element 82 must be tensioned for operation in such a manner that the slats 84 do not scrape along the bottom of the housing 62, thus minimizing wear and noise production, and it must also be ensured that the cams of the endless conveying element 82 do not slip over the complementary driving elements (i.e. teeth or cams) of the upper feederhouse roller 64. In order to produce the required tension on the endless conveying element 82 in a simple manner, an arrangement shown in FIG. 2, with which both sides of the lower feederhouse roller 80 can be brought by a spring 86 into a target position and locked there, is provided at both ends of the lower feederhouse roller 80.

Figure 2:
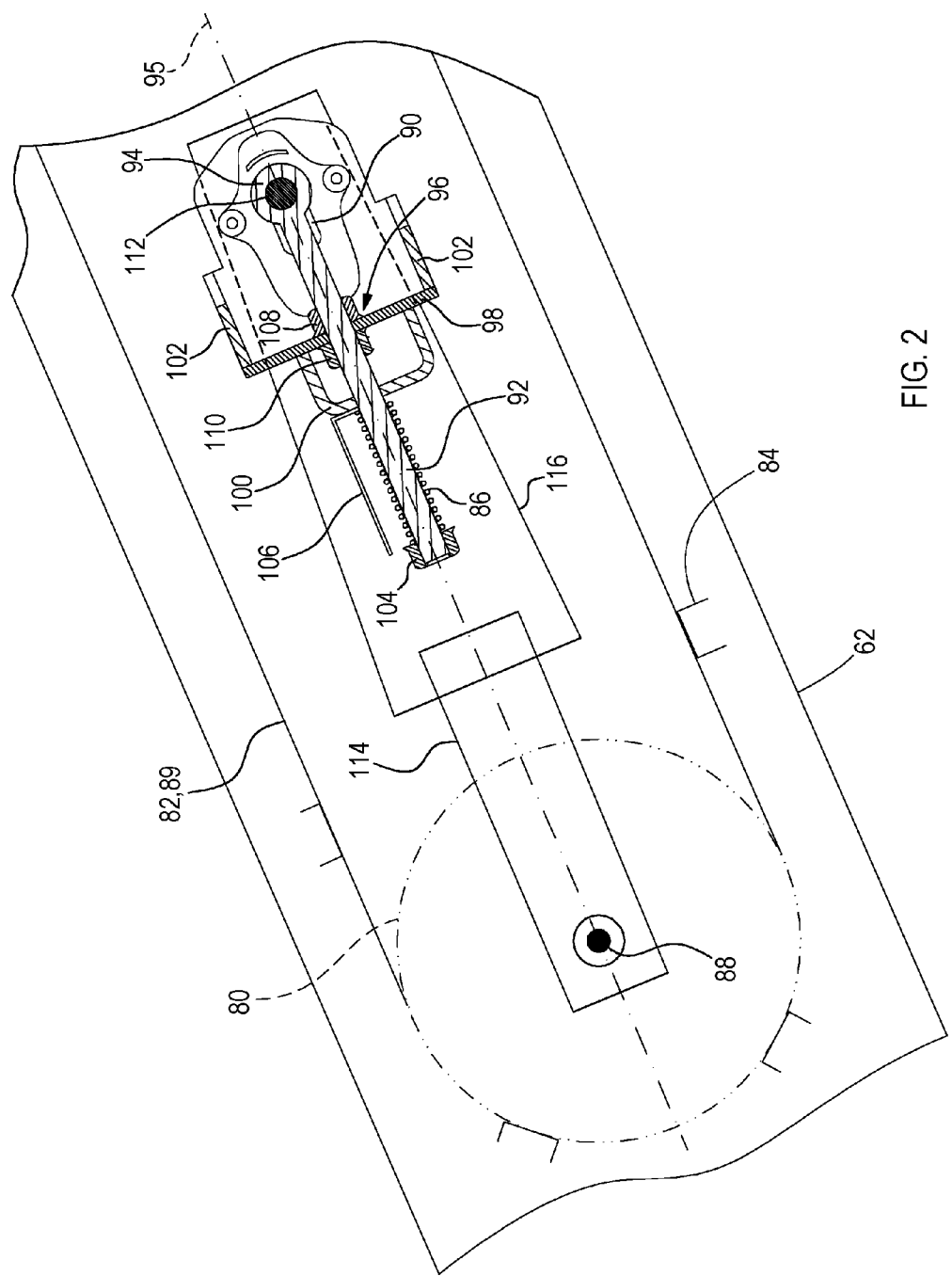
FIG. 2 shows an enlarged side view of the lower region of the feederhouse assembly from FIG. 1.

The lower feederhouse roller 80 comprises axle stubs 88 that do not rotate in operation, on which the lower feederhouse roller 80 is supported rotatably about the longitudinal axis via rotary bearings (not shown). The axle stubs 88 are connected to supports 114, that are on their end connected to a pivotable mid floor 116, which is located between the strands of the conveying element 82 and extends rearwards of the lower feederhouse roller 80 to the rear and upwards. The pivotable mid floor 116 is connected with its rear end on both sides with a pivot axis 112, respectively, extending through a slotted hole 90 in the side wall of the housing 62. The pivotable mid floor 116 is described in U.S. Pat. No. 7,766,736 B1, the contents of which incorporated by reference herein. The longitudinal direction of the slotted holes 90 extends along an imaginary connecting line between the feederhouse rollers 64, 80 or at an acute angle thereto. An adjusting rod 92 is mounted at its rear end on the pivot axis 112 by means of a bearing eye 94 and extends parallel to the imaginary connecting line 95 that extends between the rotational axes of the feederhouse rollers 64, 80. The adjusting rod 92 penetrates an opening 96 in a bracket 98, which is connected to the side wall of the housing 62 and extends transversely to the imaginary connecting line between the feederhouse rollers 64, 80, and the adjusting rod further penetrates through an additional opening in a U-profile 100, which is connected to the bracket 98 on the side of the bracket 98 facing away from the pivot axis 112. The bracket 98 comprises front legs 102 on either side of the slotted hole 90. A nut 104, which clamps a spring 86 formed as a helical compression spring between itself and the U-profile 100, is screwed onto a thread of the adjusting rod 92 at the outer end of the adjusting rod 92. The tension of the spring 86 can be varied by rotating the nut 104, and a scale or gauge 106 connected to the U-profile 100 makes it possible to pre-tension the spring 86 into a desired position, which corresponds to a defined force of the spring. Additional nuts 108, 110, which contact both sides of the bracket 98 and lock the adjusting rod 92 on the housing 62 in the position of the nuts 108, 110 shown in FIG. 2, are screwed onto threaded regions of the adjusting rod 92.

All of this results in the following procedure when the endless conveying element 82 is to be provided with a defined tension after a certain period of operation or after replacement. Any crop still present is removed from the feederhouse assembly 20 and it is then stopped. Then the springs 86 are mounted at the illustrated position and pre-tensioned with a desired force by the nuts 104, the collars of which are made to coincide with the outer end of the gauge 106 (or with a defined point of a gauge constructed as a scale). Then the nuts 108 and 110 on both sides of the feederhouse assembly 20 are loosened, i.e. brought into position at a distance from the bracket 98 by rotation. Now the lower feederhouse roller 80 is freely movable relative to the housing 62 along the imaginary connecting line between the feederhouse rollers 64, 80, because the nuts 108, 110 are loosened, but it is pulled away from the upper feederhouse roller 64 along the imaginary connecting line between the feederhouse rollers 64, 80 forward and downward by the springs 86, the force of which is transmitted via the U-profile 100 and the bracket 98 onto the housing 62 on the one hand, and on the other, onto the lower feederhouse roller 80 via the nut 104, the adjusting rod 92, the bearing eye 94, the pivot axis 112, the pivotable mid floor 116, the supports 114 and the axle stub 88. In the process, the endless conveying element 82 is tensioned with the force defined by the springs 86, and the lower feederhouse roller 80 reaches its target position. Now the nut 108 adjacent to the pivot axis 112 on either side of the feederhouse assembly 20 is rotated such that it comes into contact with the bracket 98. This measure has the effect that the lower feederhouse roller 80 cannot approach the upper feederhouse roller 64 more closely than the now achieved target position. In principle, the feederhouse assembly 20 would now be ready for operation. In order to avoid undesired vibrations and to be able to relieve the springs 86, the other nuts 110 are preferably brought into contact with the bracket 98 in order to lock the lower feederhouse roller 80 on the housing 62.

Once the proper tension has been applied to the endless conveying element 82 in this manner, and the lower feederhouse roller has been locked in place with respect to the housing 62 by tightening the nuts 108,110 against the bracket 98, the springs 86 can be relaxed by loosening the nut 104. This will lengthen the service life of the springs 86. Alternatively, the nut 104 and the springs 86 may be removed entirely.

The invention claimed is:

1. A combine harvester (10) comprising:
   wheels (14, 16) for engaging the ground and carrying the combine harvester (10) through an agricultural field;
   a chassis (12) supported on the wheels;
   a threshing drum (22) supported on the chassis (12);
   a threshing basket (34) wrapped around a portion of the threshing drum (22); and
   a feederhouse assembly (20) supported on the chassis (12) and disposed in front of the threshing drum (22), wherein the feederhouse assembly (20) comprises,
   a housing (62) having a front end configured to receive crop from an agricultural harvesting head and a rear end configured to transmit crop to the threshing drum (22),
   an upper feederhouse roller (64) rotatably mounted at the rear end of the housing (62),
   a lower feederhouse roller (80) rotatably mounted at the front end of the housing (62), and
   an endless conveying element (82) comprising an inherently flexible material, and further comprising slats (84) fastened to the inherently flexible material, wherein the endless conveying element (82) is configured to circulate about the lower feederhouse roller (80) and the upper feederhouse roller (64),
   wherein a first of the feederhouse rollers (64, 80) is mounted so as to be movable relative to the housing (62) toward and away from a second of the feederhouse rollers (64, 80) along an imaginary connecting line (95) that extends between the feederhouse rollers (64, 80),
   characterized in that the first of the feederhouse rollers (64, 80) is configured to be coupled to a spring (86), to pre-tension the first of the feederhouse rollers (64, 80) with a force directed away from the second of the feederhouse rollers (64, 80) and applies a defined tension to the endless conveying element (82), and in that the movement of the first of the feederhouse rollers (64, 80) in the direction toward the second of the feederhouse rollers (64, 80) can be limited to a target position of the first of the feederhouse rollers (64, 80) that results from the force of the spring (86), wherein a bracket (98) which extends transversely to the imaginary connecting line (95) between the feederhouse rollers (64, 80) and is furnished with an opening (96), is mounted on the outer side of the housing (62), a pivot axis (112) coupled by a pivoting mid floor (116) to an axle (88) of the first of the feederhouse rollers (64, 80) penetrates through a slotted hole (90) extending in the housing (62) along the imaginary connecting line (95), and said axle is connected to an adjusting rod (92) extending along the imaginary connecting line (95), the adjusting rod penetrating through the opening (96) in the bracket and being coupled at an outer end of the adjusting rod (92), facing away from the axle, to a first end of the spring (86), and wherein a second end of the spring (86) is supported on the housing (62) on a U-profile (100) coupled to the bracket (98), and wherein the first of the feederhouse rollers (64, 80) is fixed at the target position by fixing the adjusting rod (92) to the bracket (98).

2. The combine harvester (10) according to claim 1, wherein the first of the feederhouse rollers (64, 80) can be locked with respect to the housing (62) in the target position.

3. The combine harvester (10) according to claim 1, wherein the first of the feederhouse rollers (64, 80) is the lower feederhouse roller (80) or wherein the upper feederhouse roller (64) is drivable.

4. The combine harvester (10) according to claim 1, wherein the first of the feederhouse rollers (64, 80) can be restricted in movement or locked at both ends and is connected at each end to a spring (86).

5. The combine harvester (10) according to claim 1, wherein the spring (86) can be relaxed or removed during normal operation of the feederhouse assembly (20) and can be loaded with a defined pre-tension using a gauge (106) or a scale.

6. The combine harvester (10) according to claim 1, wherein the spring (86) is a helical spring operating by a compressive force or a tensile force.

7. The combine harvester (10) according to claim 6, wherein movement of the first of the feederhouse rollers (64, 80) to the target position is limited by a nut (108) that contacts the bracket (98) and cooperates with a thread of the adjusting rod (92).

8. The combine harvester (10) according to claim 7, wherein a second nut (110) cooperating with a thread of the adjusting rod (92) can be brought into locking contact with a second side of the bracket (98).

* * * * *